Feb. 22, 1927.
F. D. HOFFMAN
CONVEYER
Filed Feb. 1, 1926
1,618,338
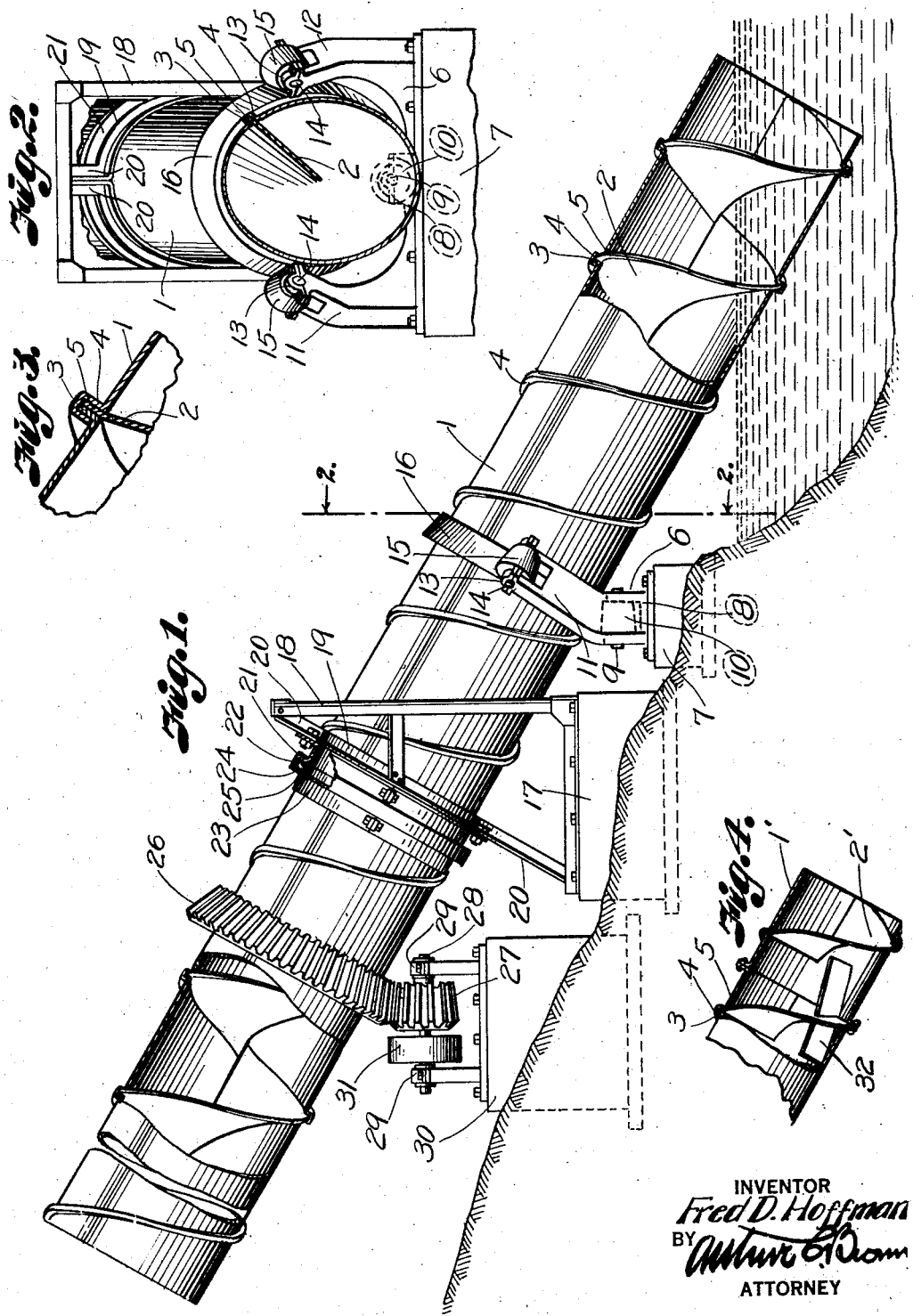
INVENTOR
Fred D. Hoffman
BY
ATTORNEY Patented Feb. 22, 1927.

1,618,338

UNITED STATES PATENT OFFICE.

FRED D. HOFFMAN, OF KANSAS CITY, MISSOURI.

CONVEYER.

Application filed February 1, 1926. Serial No. 85,199.

My invention relates to conveyers and more particularly to a fluid conveyer of the screw type for irrigation, drainage or like purposes, the principal object of the invention being to lift and convey large volumes of water for comparatively short distances and with a minimum of power.

In accomplishing this object I have provided improved details of structure, the preferred forms of which are illustrated in the accompanying drawings, wherein:

Fig. 1 is a side elevation of a conveyer embodying my improvements and illustrating its employment for irrigation or drainage purposes.

Fig. 2 is a vertical section on the line 2—2, Fig. 1.

Fig. 3 is an enlarged, detail, perspective view of a portion of the conveyer shell, illustrating its connection with the conveyer screw blade.

Fig. 4 is a longitudinal, sectional view of a modified form of tube and screw, adapted for high speed pumping.

Referring more in detail to the drawings, 1 designates the conveyer tube or shell which may be of any ordinary construction but preferably formed of a spirally jointed pipe in order to anchor the contained conveyer screw 2. With this form of construction one edge of the pipe strip is provided with an outstanding flange 3 and the other edge with box-joint flange 4, having a spread of sufficient width to receive the flange 3 together with an outstanding flange 5 on the edge of the screw blade 2, so that when the tube and screw are assembled, the screw is formed within the tube to constitute a substantially integral part with it, and the box-joint closed to make the tube watertight. Conveyers of this type are adapted for rotation as a unit as distinguished from rotation of the screw within a stationary tube or cylinder and in that the material to be moved must be carried up an incline as distinguished from mere horizontal travel. Consequently, means must be provided for supporting the conveyer on a rolling contact to carry its weight; braces must be provided for receiving end thrust due to the inclined position of the conveyer, and means must be provided for rotating the conveyer under the preceding conditions.

For the first supporting means I provide a bracket 6, having a suitable foundation 7 and a plurality of bearing members arranged in pairs, one pair 8 being preferably located at the center of the bracket and supporting a shaft 9 carrying a beveled roller 10. Extending upwardly at opposite sides of the bearing 8 and embracing the lower portion of the conveyer, when the latter is in place, are arms 11 and 12, each provided with a pair of bearing members 13 carrying a shaft 14 on which is rotatably mounted a beveled wheel 15 similar to the wheel 10 on the base bearing.

The arms are spread to embrace the conveyer tube or shell which is seated therein and the wheels 10 and 15 constructed and arranged so that their bearing surfaces will parallel the bearing surface of a beveled ring flange 16 that is welded or otherwise permanently and securely fixed to the tube 1, the ring flange being secured to the outer surface of the tube or shell, perpendicular to the axis thereof to avoid twisting strain on the tube when the latter is supported in the chair formed by the bracket 6 and the roller bearings heretofore mentioned, the axis of the roller bearing 10 being parallel with the surface of the ring flange 16 and the beveled contacting faces of the ring and roller bearings being such that the roller bearings receive the thrust from the ring flange and serve to take up end thrust of the conveyer as well as support it from below.

Located adjacent the foundation 7 is a second foundation 17 supporting a frame 18 carrying a collar 19 at an angle perpendicular to the axis of the conveyer, and preferably consisting of angle iron members, each semi-circular and having end arms 20 for attachment to the base and standard members of the frame. Fixed to the outer flanges of the semi-circular members is a collar 21 adapted for snug fit over the conveyer 2 without interfering with the rotatable movement thereof and having a ball race 22 at its outer edge.

Fixed to the conveyer tube is a collar 23 having a ball race flange 24 adapted to turn within the race 22 on the stationary collar 21, and located within the race are anti-friction balls 25 adapted to bear against the two race members and against the surface of the tube, so that the tube may roll freely thereon but be supported thereby.

Located at a convenient point on the conveyer tube is a beveled ring gear 26, meshing with a corresponding pinion 27 on the shaft 28 journalled in bearings 29 on a suitable foundation 30, the shaft being also provided with a pulley wheel 31 whereby it may be rotated from any suitable source of power (not shown).

A conveyer so constructed and assembled with the stationary support, thrust bearings and driving members, may be so supported and balanced that it may be easily rotated even with its load of liquid so that when the conveyer is employed for lifting water from the source of supply to an irrigation ditch or from the ditch to its laterals it may be operated with a small or low power motor, but is effective for lifting and transferring large volumes of water.

For slow speed pumping the single screw conveyer is efficient, but at high speed the fluid merely swirls with the tube and is not advanced by the screw. This defect may be overcome by separating the screw into sections (2' of Fig. 4) and providing baffles 32 between the sections to break up the swirling movement of the fluid; the baffles being arranged at an angle opposite to that of the screw sections and preferably comprising metal strips attached to the screw sections and extended into the spaces between said sections as shown.

As operation of the conveyer is obvious from the drawing and the foregoing description, and while I have described the conveyer in connection with a particular use, its adaptability for other specific purposes is apparent.

What I claim and desire to secure by Letters-Patent is:—

1. In combination with a conveyer tube, rolling contacts for supporting the tube, bevelled rolling contacts for absorbing end thrust of the tube, and means for rotating the tube.

2. In combination with a conveyer tube, a thrust bearing comprising a ring fixed to the tube on a line perpendicular to its axis and having a beveled face, a bracket having arms embracing the tube, and roller bearings on said arms having oppositely beveled faces paralleling the face of the conveyer ring and having supporting contact therewith.

3. In combination with a conveyer tube, a thrust bearing comprising a ring fixed to the conveyer on a line perpendicular to its axis and having a beveled face, a bracket having arms embracing the tube, a roller bearing at the base of the bracket, and roller bearings on said arms, said roller bearings having faces beveled oppositely to said ring paralleling the face of the conveyer ring and having supporting contact therewith.

4. In combination with a conveyer tube, means for supporting the conveyer, a frame, semi-circular members suspended in the frame, a collar carried by said members and surrounding the tube, a ball race seat on said collar, a collar fixed to the tube, a ball race cap on said last named collar co-operating with said seat, anti-friction members in said ball race, and means for rotating the tube.

5. In combination with a conveyer tube, means for supporting the tube comprising an anti-friction bearing, anti-friction means between the ends of said tube for absorbing end thrust of the tube, a beveled ring gear on the tube, and a driven, beveled gear wheel meshing with said ring gear to rotate the tube.

6. In a conveyer of the character described, a tube formed from a single spirally wound strip of sheet metal having a flanged edge portion forming an inwardly facing groove along one edge thereof and an outturned flange along the opposite edge thereof interfitting with said groove, and a conveyer screw within the tube having an edge flange fitting in said groove in the tube and held therein by the interfitting flanges of said tube to lock the screw in place in the tube, means for supporting the tube and means for rotating the tube.

7. In a conveyer of the character described, a tube, an interrupted screw in said tube and baffles attached to the screw sections intermediate the ends thereof and extending therefrom in a direction reverse to that of the screw.

In testimony whereof I affix my signature.

FRED D. HOFFMAN.